UNITED STATES PATENT OFFICE.

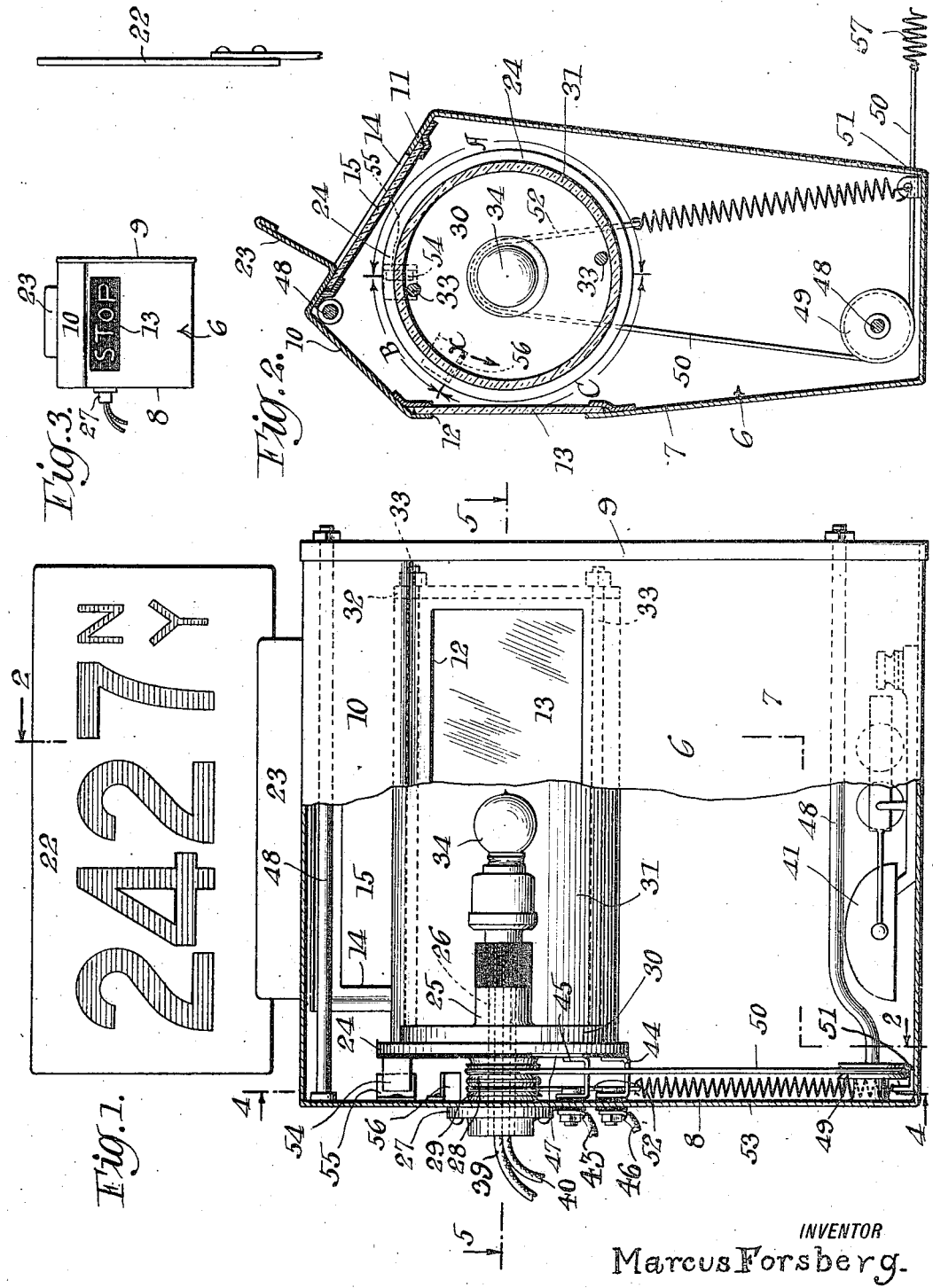
M. FORSBERG.
VISUAL AND AUDIBLE SIGNAL FOR AUTOMOBILES.
APPLICATION FILED AUG. 27, 1915.
1,237,498.
Patented Aug. 21, 1917.
2 SHEETS—SHEET 1.
INVENTOR
Marcus Forsberg.
BY
Wallace White
ATTORNEY M. FORSBERG.
VISUAL AND AUDIBLE SIGNAL FOR AUTOMOBILES.
APPLICATION FILED AUG. 27, 1915.
1,237,498.
Patented Aug. 21, 1917.
2 SHEETS—SHEET 2.
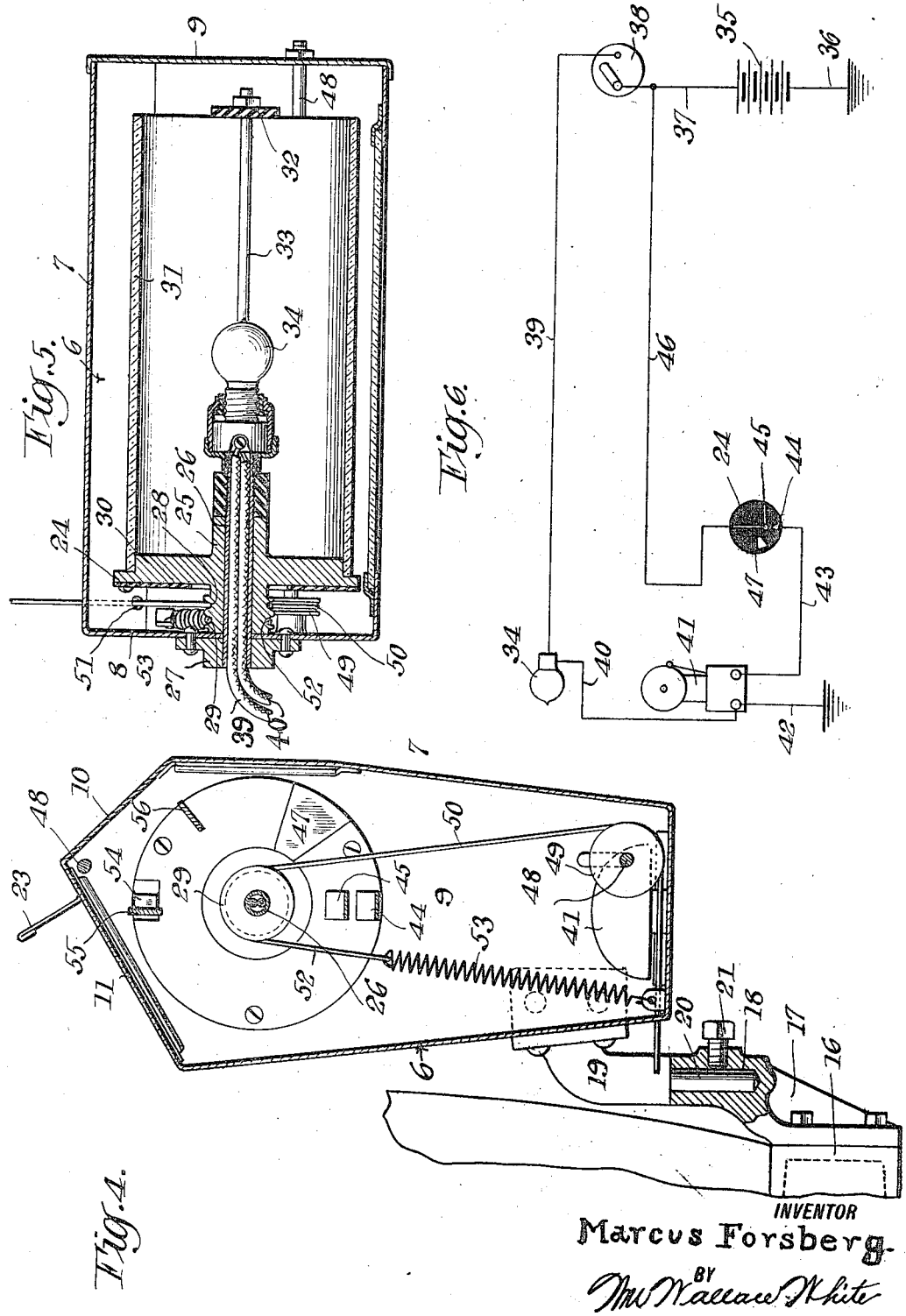
INVENTOR
Marcus Forsberg.
BY
Wallace White
ATTORNEY

MARCUS FORSBERG, OF NEW MARKET, NEW JERSEY.

VISUAL AND AUDIBLE SIGNAL FOR AUTOMOBILES.

1,237,498.  Specification of Letters Patent.  Patented Aug. 21, 1917.

Application filed August 27, 1915. Serial No. 47,574.

*To all whom it may concern:*

Be it known that I, MARCUS FORSBERG, a subject of the King of Sweden, residing at New Market, county of Union, State of New Jersey, have invented new and useful Improvements in Visual and Audible Signals for Automobiles, of which the following is a specification.

This invention relates to the class of signals and more particularly to signal devices for automobiles.

The invention comprehends the provision of a new and useful visual and audible signal for automobiles or other vehicles, the device being such as to combine in a single structure, a mechanical automobile signal designed to operate in rear of the car and to warn the driver or chauffeur of a car following in rear thereof, when the preceding car is to be brought to a stop or is about to make a turn to the right or left with or without stopping, notice being given at the same time to the driver of the car provided with the signal to indicate the operativeness thereof, as well as to gain the attention of the operator of the car following the signal that it may be taken notice of and heeded, while the device further includes a tail lamp which is disclosed to view during the ordinary running of the car, in connection with means for reflecting a light upon the license sign usually employed, thereby obviating the necessity of having different lighting sources for these purposes.

A further object of the invention is the provision of a signal device of the character named which will be operative in connection with the operation of the service brake or clutch pedal of an automobile, as distinguished from the emergency brake, so that simultaneously with the operation of stopping the car and in turning the same, a stop sign will be exposed to view in rear of the car for the purposes above specified, while associated in an electrical circuit including the lighting or illuminating means for said signal, which is in the form of a visible one, is an audible signal in the form of a bell which operates in unison with the visual signal, so that the operator or driver of the car carrying the signal will be informed immediately if the signal fails to operate by the omission of the ringing of the bell, if under any circumstance not under control, this should happen. The device is, however, so constructed as to be simple in structure, simple and efficient in operation, durable and practical in its application and not likely to get out of working order.

With the above objects and others in view which will appear as the specification proceeds, the invention resides in the certain novel combinations and arrangements of parts as will be hereinafter more fully described, claimed and illustrated in the accompanying drawings, in which:

Figure 1 is a rear elevation partly in section, of a signal device constructed in accordance with my invention.

Fig. 2 is a vertical sectional view thereof taken on the line 2—2 of Fig. 1.

Fig. 3 is a rear elevation on a reduced scale of the sign device, showing the stop sign exposed to view.

Fig. 4 is a vertical sectional view on the line 4—4 of Fig. 1.

Fig. 5 is a horizontal sectional view taken in the line 5—5 of Fig. 1, and

Fig. 6 is a diagrammatic view of the wiring plan for operating the visual and audible signals.

As illustrated in the drawings, the improved signal device includes a casing 6 of the form best shown in Figs. 1 and 2 of the drawings as particularly fitted or adapted to inclose the working parts thereof in a compact space. The casing includes the lateral section 7 having an end wall 8 and a removable end wall 9 flanged around its edges to receive the adjacent end of the body or lateral section of the casing against the inner face thereof. The bottom of the casing is horizontally disposed and the front and rear walls thereof diverge upwardly whereby the casing is made wider at the top portion than at the bottom, while the top of the casing consists of oppositely sloping forward and rear portions 10 and 11 respectively, there being an opening 12 in the front beneath said portion 10 which is covered to protect the interior of the casing from the effects of inclement weather by a transparent panel 13. The portion 11 is provided with an opening 14 having a transparent cover panel 15. The casing is designed to be supported upon the crossbar 16 between the side beams of the chassis of the automobile at the rear of the body, and for this purpose there may be secured to said crossbar, a bracket 17 having a socket 18 vertically therein, or what may be termed a socketed portion. To one side of the casing a co-acting bracket section 19 is secured to project rearwardly and downwardly from the casing whereby to engage the socketed portion 18 through the medium of a depending stem 20 adapted to be held in a fixed position as by means of a clamping or set screw 21 engaged through the wall of the socket.

In this manner, the casing which contains a source of light as will be hereinafter more fully described, is in position to reflect the rays thereof upon a license sign 22 suitably supported in the rear of the body above and forward of the opening 14, the section of the body or lateral wall which is cut out to produce the opening 14 being bent upwardly to produce a reflector 23 adapted to shadow the light and to throw the rays thereof upon the license sign whereby it will be rendered clearly discernible.

Rotatably supported in the casing is a sign drum or cylinder, the same including an end plate 24 having a long sleeve bearing 25 rotatably supported upon a hollow stub-shaft 26 suitably secured or bolted to the end portion 8 of the casing, as through the medium of a flange 27. The sleeve 25 is extended beyond the end plate 24 and is grooved to provide a pair of pulleys 28 and 29, the rotation of which will result in the rotation of the sign drum. Mounted on a flange 30 of the end plate 24 and which projects toward the center of the casing, is a drum or cylinder 31, the same being retained in position between the end plate 24 and end plate 32 provided at the opposite end of the cylinder, by means of a plurality, preferably a pair of longitudinal binding members or bolts 33 serving to connect and draw said end plates toward the end of the cylinder whereby to cause a binding engagement thereat. The cylinder 31 is made of transparent material, such as glass, celluloid, or the like, and one-half of the circumference thereof is left transparent, such portion being that to the right of a line dividing the cylinder vertically through the center and designated "A" in Fig. 2, so that the upper portion thereof will be in position to permit light rays to be cast through the opening 14 and on to the license sign. The upper third of the remaining portion designated by the letter "B" and hidden beneath the top portions 10 and 11, is provided with the indication "Stop," the cylinder being darkened or blotted out around the letters so that the latter will appear in white through the transparent drum. The remaining portion or two-thirds designated by the letter "C" is colored red to indicate danger and to be normally disclosed to view through the panel 13 for forming a tail light for the automobile.

At the inner end of the stub-shaft 26, an electric light bulb 34 is mounted, the drum being designed to turn independently of said shaft and the light bulb, which latter is located axially with respect to the drum and is electrically insulated from the drum sleeve 25 or the shaft 26 and thus the casing. The diagram of the circuit for operating the signals is best shown in Fig. 6 of the drawings in which the source of electrical supply which may take the form of batteries 35 have one leg grounded through a conductor 36, preferably to the casing 6 or the body of the vehicle, while the other leg leads to the medium of a conductor 37 to one pole of a single throw switch 38, from the opposite pole of which a conductor 39 extends to one pole of the incandescent electric lamp 34. The light circuit is continued through a conductor 40 leading from the other pole of the lamp to one pole of an electric bell or other audible signal 41, which is grounded likewise to the body through a conductor 42. The other binding post or pole of the bell is connected by a lead 43 with one contact point 44 mounted on but electrically insulated from the end portion 8 of the casing adjacent to the end plate 24. Also mounted on said end plate and electrically insulated therefrom is another fixed contact 45 connected through a lead 46 to the leg 37 of the supply source, while mounted to rotate with the signal drum is a movable contact plate 47, the same being mounted upon an insulated disk secured to said circular end plate and being normally positioned out of engagement with respect to the fixed contacts 44 and 45, so that the bell circuit is normally open. In practice, the bell or signal device 41 is mounted in the bottom of the casing 6 beneath one of a pair of bolt members 48 which connect the ends of the casing and draw the same toward the lateral section thereof at points adjacent to the top and bottom of the casing. The lower bolt member serves to rotatably carry a grooved pulley 49 under which a cable 50 is passed after being wound upon the pulley 28, the cable being then extended through an opening in the casing as shown at 51 and connected to either the brake or clutch pedal of an automobile so as to be moved simultaneously with the operation of the service brake or clutch. A cable 52 is wound upon the pulley 29 in an opposite direction to the direction in which the cable 50 is wound, the cable 50 extending downwardly from the rear and the cable 52 extending forwardly toward the back portion of the casing and connected to a retractile coil spring 53 at one end of the latter, while the opposite end of the spring is anchored to the bottom of the casing so as to exert its tension in retracting to pull upon the cable 52 whereby to normally unwind the cable last mentioned and to wind the cable 50 upon the pulley 28. When so held, the tail light will be exposed to view through the opening 12 and panel 13 thereof, the cylinder being held from further rotation by the engagement of a laterally projecting lug 54 of the end plate 24 with a stop projection 55 secured to the end portion 8 of the casing. The light circuit is controlled through the switch 38, said switch being left open in the daytime, but closed at night so as to ignite the lamp 34 and thereby light the tail light signal. In either event, however, when the chauffeur operates the service brake or clutch pedal, as the case may be, to bring the car to a stop, although not necessarily bringing the same to a standstill, pull will be exerted on the cable 50 so as to turn the drum in the direction indicated by the arrow "X" in Fig. 2 of the drawings, against the action of the tension spring 53 so as to wind the cable 52 on the pulley 29 and to unwind the cable 50 from the pulley 28 while said cable passes under the pulley 49 without undue friction. The cylinder or drum is limited in its rotation in the direction indicated by the arrow "X," by the engagement of the lug 54 with a stop projection 56 also anchored to the casing at the end wall 8, so that when further rotation of the drum is prevented, suitable slack means such as a spring 57 being provided in the brake connection or cable 50, to compensate for this, the stop sign will be exposed to view through the panel 13 while the light rays will at the same time remain reflected upon the license sign, presuming that the lamp is lighted.

As the cylinder is rotated for exposing the stop sign so as to indicate to the operator or driver of a car following that a stop or turn is to be made and that the speed of the car will be slackened, so as to avoid collisions which might otherwise occur, the bridge-piece or contact plate 47 will be moved in position to bridge the fixed contacts 44 and 45, thereby closing the electric circuit through the audible signal or bell to operate the latter in unison with the operation of the visual signal. The purpose of the audible signal is two-fold, since it not only warns the operator of the car to which the device is attached, that the signal device is operating, but warns or calls the attention of the driver of the following car to the stop signal and thereby causes him to be alert to traffic conditions and the fact that a stop or slow down must be made. Since it is customary to bring a car to a stop or substantially so before turning, collisions from such conditions will also be avoided and as soon as the service brake or clutch pedal is released and the speed of the car increased, the spring 53 will serve to oppositely wind the cables and return the drum to its original and initial position, again bringing the tail light to view and excluding vision of the stop sign. The device can be operated in a simple and efficient manner, and will be useful in the daytime, as well as at night time, although by reason of the independently controlled circuit for the electric lamp or light source, and the audible signal or bell, the lamp can be extinguished in the day time, when the signal would be readily discernible without the same, including the license sign.

It will thus be seen that I have provided a very efficient and simple form of combined mechanical automobile signal and tail lamp consisting of a combination of an audible and a visible signal, which will greatly reduce the bulk of such devices heretofore devised for indicating the direction of movements of a car at the rear thereof, and which will be rendered absolutely noticeable owing to the calling of the attention of the driver of a car following the one to which the signal is applied, without taking his attention from the operation of his car. It is also to be understood that while I have described a structure which is believed to be the preferred embodiment of the invention, I may make such changes and modifications in the structure as shall come within the scope of the invention described and claimed.

Having thus particularly described my invention, what I claim and desire to secure by Letters Patent of the United States of America is:

In a device of the character described, the combination of a casing whose top portion has an inclined part extending downwardly to the rear wall with the downwardly directed part provided with an opening having a transparent cover, said casing also provided with an opening in its front wall having a transparent cover, a rotatable indicating drum located in the casing immediately under said inclined part of the top and between said openings, means for holding the drum in normal position, means for rotating the drum against the action of said holding means, and means for illuminating the drum, said top having an upwardly directed reflector support adjacent to and inclined rearwardly of the casing from the front side of said top opening whereby the light rays projecting upwardly through said top opening are all directed upwardly and rearwardly from the top opening.

In testimony whereof I have signed my name to this specification in the presence of two subscribing witnesses.

MARCUS FORSBERG.

Witnesses:
JOHN E. BURCH,
JOHN C. SANDERS.